Dec. 13, 1955　　G. A. VISSER ET AL　　2,727,115
PROTECTED THERMOSTATIC CONTROL AND
METHOD OF MAKING THE SAME
Filed Dec. 24, 1952
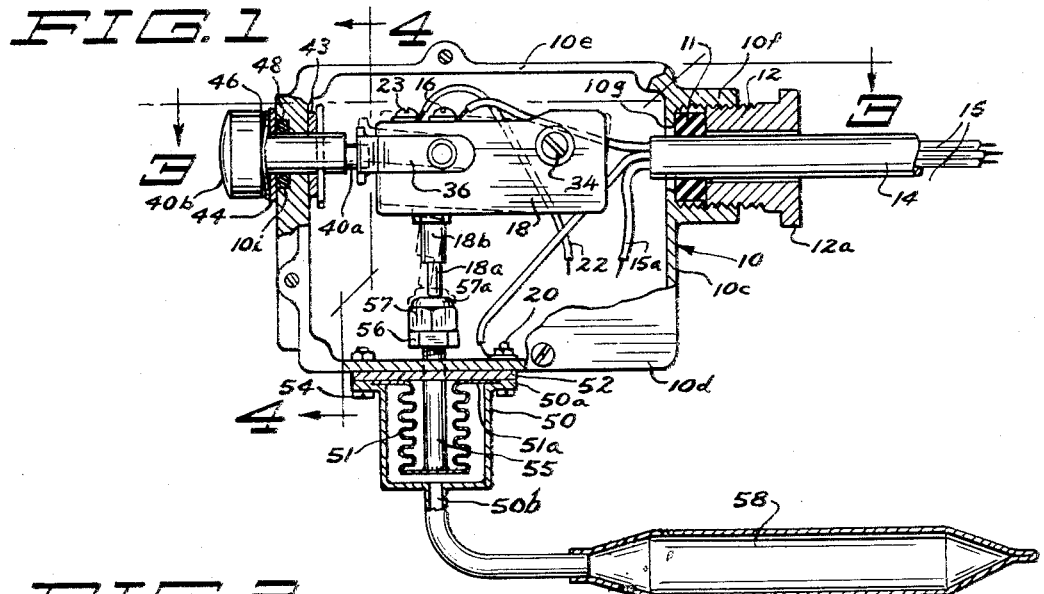
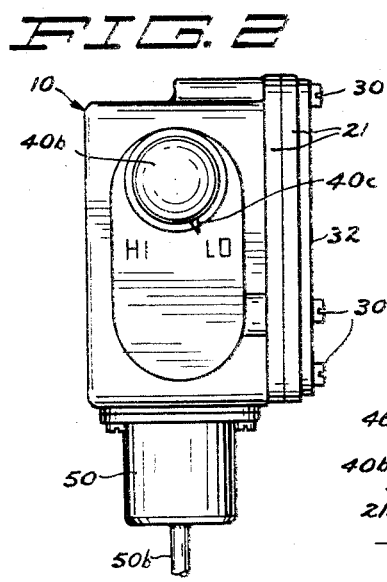
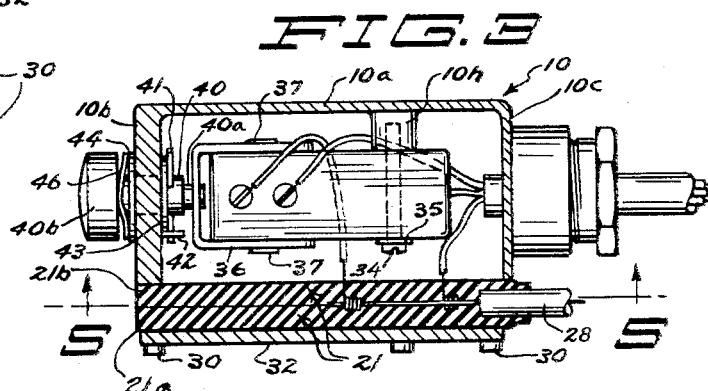
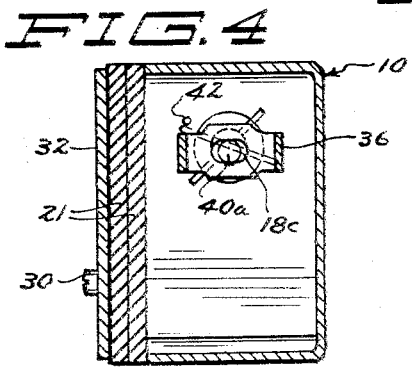
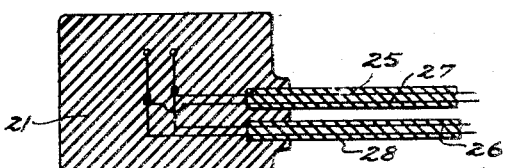
INVENTORS
JESSE A. CRAWFORD
ADELBERT H. MELCHERT
GERRIT A. VISSER
BY Chas. C. Reif
ATTORNEY.

United States Patent Office 2,727,115
Patented Dec. 13, 1955

2,727,115

PROTECTED THERMOSTATIC CONTROL AND METHOD OF MAKING THE SAME

Gerrit A. Visser, Adelbert H. Melchert, and Jesse A. Crawford, Waterloo, Iowa, assignors to Hawkeye Steel Products Inc., Waterloo, Iowa, a corporation of Iowa Application December 24, 1952, Serial No. 327,866

10 Claims. (Cl. 200—168)

This invention relates to an electrical and thermostatic control device, and particularly to such a device constructed for very fine adjustment. While said device may have various applications, in the embodiment of the invention illustrated, it is particularly designed and constructed for use as a heat regulating control which is made to be quite waterproof. In certain devices, such as a heating device for animal feeding devices and watering troughs, a very difficult problem is presented in protecting certain parts of the device from moisture and acids. Certain acids are formed, and these, together with any moisture present, act to very seriously corrode the contacts of switches and other electrical parts of the device.

It is an object of this invention to provide a control adapted to be used in a temperature control, one which can be set for very fine adjustment or very delicate operation, and one which will be protected from corrosion.

It is a further object of the invention to provide a structure of control device comprising a casing in which a micro-switch is disposed, said micro-switch comprising a casing having an actuating plunger projecting therefrom and adapted to be engaged and operated by a heat control member. Said casing is mounted for oscillated control by a knob or handle and the various conductors necessary for said switch are contained in a protective casing and sealed so as to be protected from corrosion, liquids or gases.

It is more specifically an object of the invention to provide a control device comprising a main casing in which is mounted for oscillation a casing of a switch, such as a micro-switch, said latter casing being oscillatable by a knob or handle disposed without said main casing. Said micro-switch has an actuating member at one side thereof which is arranged to be engaged by a heat-actuated member for operating said micro-switch. By oscillating said micro-switch casing to different positions a very delicate adjustment can be had for said micro-switch. The necessary conductors for said switch and other operating parts are sealed in said switch casing to protect the same from corrosion, liquids or gases.

These and other objects and advantages of the invention will be fully set forth in the following description made in connection with the accompanying drawings in which like reference characters refer to similar parts throughout the several views and in which:

Fig. 1 is a view partly in plan and partly in horizontal section, the same showing the switch casing with its cover removed;

Fig. 2 is a view in end elevation of the structure shown in Fig. 1;

Fig. 3 is a horizontal section taken substantially on line 3—3 of Fig. 1, as indicated by the arrows;

Fig. 4 is a vertical section taken on line 4—4 of Fig. 1, as indicated by the arrows; and Fig. 5 is a horizontal section taken on line 5—5 of Fig. 3.

Referring to the drawings, a control device is shown comprising a main casing 10. Casing 10 is of box-like form, being rectangular in horizontal and vertical cross section. Casing 10 is open at one side and has a bottom wall 10a, end walls 10b and 10c, and side walls 10d and 10e. End wall 10c has a boss 10f formed thereon, which boss is bored and interiorly threaded and has an opening 10g into casing 10. A sealing member 11 is disposed in the bore of boss 10f which sets against the shoulder formed by the opening 10g which is smaller than said bore. A gland 12 having a hexagonal head 12a is threaded into boss 10f and presses upon the member 11 to press it firmly against said shoulder to provide a very tight seal for opening 10g. A conduit 14 of rubber or similar material extends through gland 12 and member 11 into casing 10, the same fitting very tightly in an opening in member 11, and said conduit may be vulcanized to member 11. A plurality of conductors 15, shown as three in number, extend through conduit 14 into casing 10 and one of these is connected to a contact 16 on a micro-switch casing 18. Another one of said conductors is connected to a contact 20 on casing 10. A third one of said conduits, namely 15a, extends into a member 21 extending over the open side of casing 10. Another conductor 22 extends from a contact 23 on casing 18 into member 21. Member 21 comprises two layers 21a and 21b of rubber or similar material and said conductors 15a and 22 are respectively connected to conductors 25 and 26 disposed in conduits 27 and 28 which extend into and are vulcanized to member 21. The joints or connected portions of contacts 15a, 22 and 27 and 28 are disposed in spaced relation between portions 21b and 21a, and said latter portions are then vulcanized or fused so that member 21 becomes one integral piece, and the said conductors and joints are thus completely sealed and contained in a member which is impervious to moisture or corrosive liquids. Conduits 27 and 28 also extend between portions 21b and 21a and are fused and integrally connected thereto. The member 21 is pressed tightly against the open side of casing 10 and very tightly secured thereto by a plurality of screws 30 which extend through a cover plate 32 and into bosses formed on the walls of casing 10. The micro-switch casing 18 contains a micro-switch. Such a switch is now well known in the art and need not be specifically described. A micro-switch comprises a pair of contacts arranged for small and accurate movement and these contacts are moved to move the switch to closed or open position by a plunger 18a which projects through a boss 18b at one side of casing 18. Casing 18 is mounted for small swinging movement and for this purpose a headed screw 34 extends through said casing adjacent one end and is threaded into a boss 10h projecting inwardly from bottom wall 10a. A washer 35 underlies the head of screw 34. Casing 18 also has secured thereto a yoke 36 having side portions engaging said casing and secured thereto by headed screws or rivets 37. The sides of yoke 36 may be also spot welded to casing 18. The end of yoke 36 extends across one end of casing 18 and is spaced a short distance therefrom. Said end has therein a slot 18c which extends longitudinally of said end of said yoke. A cylindrical end 40a of a cylindrical member 40 extends into slot 18c and said portion 40a is eccentric to the larger cylindrical portion of member 40. Member 40 has a pin 41 extending therethrough and the same is adapted to engage a pin 42 secured in and projecting from the end wall 10b of casing 10. As shown in Fig. 4, the pin 41 is adapted to engage pin 42 so that the latter acts as a stop. A sealing washer 43 surrounds member 40 and engages the inner side of end wall 10b while another sealing washer 44 also surrounds member 40 and engages the outer side of end wall 10b. A strong spring 46 is disposed between the outer washer 44 and an enlarged knob or handle portion 40b of member 40. Spring 46 thus acts to move member 40 outwardly so that pin 41 presses washer 43 against the inside of wall 10b and also presses washer 44 against the outer side of wall 10b. A recess 10i is formed in the outer side of wall 10b about member 40, said recess being right angular in radial cross section, as shown in Fig. 1, and an O-ring 48 is disposed in said recess and engaged by washer 44 and member 40. A very tight seal is thus provided about member 44. Knob or handle 40b is provided with a pointer 40c and the end 10b of casing 10 carries the indicia HI and LO in spaced relation.

A casing member 50 is secured to side wall 10d, the same having a base plate 50a. Plate 50a is recessed slightly to receive the enlarged end flange 51a of a bellows member 51 which is secured to said plate in any suitable manner. A sealing member 52 of rubber or similar material is disposed between plate 50a and the wall 10d. Casing 50 is secured to casing 10 by a plurality of headed and nutted bolts 54 extending through plate 50a, member 52 and the wall 10d. Member 52 is very tightly pressed against wall 10d to form a tight seal. Bellows member 51 has secured to its outer end a rod 55 which extends into casing 10 and has a pair of nuts 56 and 57 threaded thereon. Nut 57 has a central projection 57a adapted to engage the end of plunger 18a. Casing 50 has secured to its outer end a tube 50b which communicates with casing 50 and at its other end is connected to an elongated casing 58 of rather large size which is adapted to be placed in the water of a feeding trough or similar location. Tube 50b is integrally connected to casing 50 and will be provided with an absolute seal where it is connected to member 58, as by soldering or welding. When all of the parts in and secured to casing 10 have been assembled, said casing is dipped into a solution of molten rubber or similar material, and is thus provided with a thin coating of such material which seals all cracks between casing 10 and members secured thereto.

In operation, the conductors extending from the end of member 21 in the conduits 27 and 28 will respectively extend to heating devices which are placed in contact with or in close proximity to a portion of an animal feeding trough or a similar feeding device where it is desired to control the temperature of the medium to be fed. The conductors 15 will be connected to an electrical plug adapted to be connected to a socket connected to a source of electric current. The current must pass through the micro-switch 18. The temperature desired can be controlled by turning knob 40b. If a high temperature is desired, the pointer 40c will be disposed adjacent the indication HI. If a low temperature is desired, the pointer 40 will be turned to be adjacent the indication LO. Various temperatures can thus be determined for the liquid or medium to be heated. Turning the knob 40b turns member 40 and rotates the eccentric pin portion 40a. Pin portion 40a engages the sides of slot 18c and when it is rotated, yoke 36 will be moved one way or the other and casing 18 oscillated about the axis of screw 44. This will move casing 18 and plunger 18a closer to or farther away from the end portion 57a of the nut 57. Nuts 56 and 57 can be positioned in different positions on rod 55. When the temperature in member 58 rises beyond the desired point, the fluid in casing 50 will be put under pressure and bellows 51 will be compressed. This will move rod 55 toward plunger 18a and said plunger will be moved to open the micro-switch in casing 18. If the temperature in member 58 falls below a certain point, the fluid in member 58 and casing 50 will contract and bellows 51 will expand, thus moving rod 55 outwardly and permitting plunger 18a to be moved outwardly to close the micro-switch in casing 18. The temperature of the water in the feeding trough or other medium will thus be nicely regulated. It will be seen that when gland 12 is turned that it will be moved into boss 10f and will press the yielding member 11 against the shoulder and flange formed about opening 10g so that said member 11 will form a very tight seal for opening 10g. Member 11 will be compressed and this will force it very tightly against the inner side of boss 10f and against said flange and shoulder as well as against conduit 14. As stated, member 11 can be vulcanized or fused to conduit 14 to provide an absolute or hermetical seal. The structure about member 40 also provides a very tight seal. Washers 43 and 44 will be made of beryllium copper or of some yielding material, such as rubber or similar material, and they will, as stated, be very tightly held against the inner and outside surfaces of end 10b. They will also be pressed very closely against member 40. Member 40 will be very tightly engaged by the O-ring 10i to further improve said seal. Washers 43 and 44 when made of beryllium copper provide tension against the O-ring 48 which preferably is made of neoprene. Member 52 will also provide a very tight seal about the opening through which rod 55 passes. When the outer coating is applied to casing 10 and the parts carried thereby, an absolute or hermetical seal is further provided.

From the above description it will be seen that we have provided a comparatively simple and yet very efficient switch for controlling the temperature of a liquid in a feeding trough or other similar device. A very serious problem has arisen with switches used in such a location as above described. Certain corrosive gases and liquids are formed and these have a very damaging and deteriorating effect on the switch parts. The parts become corroded to an unbelievable degree and these parts eventually become inoperative. In the present construction the parts in casing 10 and casing 50 are completely protected and insulated against the entrance of any gas, liquid or moisture which would corrode or adversely affect the switch. This complete protection is provided by the member 21, the member 11, the members 43 and 44, the O-ring 48, the plate 52 and finally by the coating of liquid-proof material placed over the entire exterior of the device. Such a device as described using the disclosed switch has been subjected to tests over a long period and found to be free of the terrific corrosion which has previously occurred in the switch parts. Many efforts were previously made to overcome the above mentioned problem but success was not attained until the present structure was constructed and used. The device has been amply tested in actual practice, found to be very successful and efficient, and the same is now being commercially made.

It will of course be understood that various changes may be made in the form, details, arrangement and proportions of the device and in the steps and sequence of steps of the method without departing from the scope of applicants' invention, which, generally stated, consists in a method and device capable of carrying out the objects above set forth, such as disclosed and defined in the appended claims.

What is claimed is:

1. An insulated switch structure having in combination, a metal casing, said casing having a boss projecting therefrom, a unitary externally threaded gland threaded into said boss, said boss having an opening into said casing surrounded by a portion forming a shoulder in said boss, a sealing member of yielding material disposed between said gland and shoulder and a conductor-containing conduit of yielding material extending through said gland, sealing member and opening, said sealing member being adapted to be compressed by said gland to tightly seal said opening and have very close engagement with said conduit.

2. An insulated switch structure having in combination, a metallic casing, a switch casing within said casing, a plurality of conduits in said casing, said first mentioned casing having an open side, a member of yielding material tightly engaging said open side so as to form a moisture and waterproof seal, said member comprising two layers, a pair of conduits of yielding material extending into the end of said member, conductors in said conduits respectively, said latter conductors being joined to said conductors within said casing by joints disposed in spaced relation in said member and between said layers, the end of said conduit also being disposed between said layers, said layers being fused or vulcanized together to form said layers and conduit into an integral member, and means for holding said member tightly against said casing.

3. The structure set forth in claim 2, said first mentioned casing and member being covered with a thin integral coating of rubber-like material impervious to liquids or gases.

4. An insulated switch structure having in combination, a casing, a switch casing within said casing mounted for swinging movement, means for swinging said casing including a cylindrical member connected to said casing and extending through an opening in said casing, a knob on said member at the outer side of said casing, yielding flat members surrounding said member tightly engaging the same and disposed at the inner and outer sides of said casing for tightly engaging said inner and outer sides, a second member secured to said member and engaging the inner side of the inner one of said members, a spring disposed between said knob and the outer side of the outer of said sealing members whereby said sealing members are tightly pressed against the inner and outer sides of said casing to form a tight and moisture-proof seal.

5. The structure set forth in claim 4, the wall of said casing being provided with a recess about said member, an O-ring in said recess engaging said member and engaging the outer one of said sealing members.

6. The structure set forth in claim 5, said first mentioned casing being covered with a thin coat of rubber-like material impervious to liquids or gases, the same acting to seal the crack between said outer sealing member and said first mentioned casing.

7. The method of making a sealed switch casing which consists in providing a switch casing having an open side with a flat surface throughout said side, extending electric conductors from said casing and through said open side and into a layer of fusible insulating material, respectively connecting said conductors to other electrical conductors extending from a conduit of fusible insulating material by joints, disposing said joints and end of said conduit between said layer and another layer of fusible insulating material fusing said layers together and to said conduit to form an integral block with said joints entirely enclosed in said block, and pressing said block against said surface about the open side of said casing to seal the same.

8. The method set forth in claim 7, and then dipping said casing in a body of molten insulating rubber-like material to hermetically seal the same.

9. A sealed switch casing having in combination, a thermostatic device, means securing said device to said casing by connecting means, means for sealing said second mentioned means, a flexible conduit having electrical conductors therein, a block of insulating material fused to said conduit means connecting said block to said casing to seal said casing, means for securing a second conduit containing electrical conductors to said casing by connecting means, means sealing said last mentioned connecting means, said casing having a coating thereon formed by dipping the same in a body of molten insulating rubber-like material for hermetically sealing the same.

10. An insulated switch structure having in combination, a metal casing, said casing having a boss projecting therefrom, a unitary externally threaded gland threaded into said boss, said boss having an opening into said casing surrounded by a portion forming a shoulder in said boss, a sealing member of yielding material disposed between said gland and shoulder and a conductor-containing conduit of yielding material extending through said gland, sealing member and opening, said sealing member being adapted to be compressed by said gland to tightly seal said opening and said sealing member being fused to said conduit so as to be integrally connected therewith.

References Cited in the file of this patent
UNITED STATES PATENTS

| | | |
|---|---|---|
| 640,533 | Callahan | Jan. 2, 1900 |
| 1,333,004 | Vaughn | Mar. 9, 1920 |
| 1,702,326 | Veronneau | Feb. 19, 1929 |
| 1,931,043 | Taylor | Oct. 17, 1933 |
| 2,338,524 | McCabe | Jan. 4, 1944 |
| 2,408,502 | Writzman | Oct. 1, 1946 |
| 2,464,029 | Ehrman | Mar. 8, 1949 |
| 2,493,190 | Fuchs | Jan. 3, 1950 |
| 2,502,860 | Leithiser | Apr. 4, 1950 |
| 2,504,435 | Matteson | Apr. 18, 1950 |
| 2,520,576 | Stookey | Aug. 29, 1950 |
| 2,563,829 | Fitzgerald et al. | Aug. 14, 1951 |
| 2,632,083 | Shaffer | Mar. 17, 1953 |